Nov. 25, 1958 E. BÜHRER ET AL 2,861,672
INTER-CONVEYER TRANSFER MEANS FOR USE WITH
MULTIPLE CONVEYER SYSTEMS
Filed Dec. 28, 1955 6 Sheets-Sheet 1

INVENTORS
ERWIN BÜHRER
MAX WERNLI
BY

Nov. 25, 1958  E. BÜHRER ET AL  2,861,672
INTER-CONVEYER TRANSFER MEANS FOR USE WITH
MULTIPLE CONVEYER SYSTEMS
Filed Dec. 28, 1955  6 Sheets-Sheet 2

INVENTORS
ERWIN BÜHRER
MAX WERNLI
BY

Nov. 25, 1958     E. BÜHRER ET AL     2,861,672
INTER-CONVEYER TRANSFER MEANS FOR USE WITH
MULTIPLE CONVEYER SYSTEMS Filed Dec. 28, 1955     6 Sheets-Sheet 3

INVENTORS
ERWIN BÜHRER
MAX WERNLI
BY

Nov. 25, 1958

E. BÜHRER ET AL 2,861,672

INTER-CONVEYER TRANSFER MEANS FOR USE WITH
MULTIPLE CONVEYER SYSTEMS

Filed Dec. 28, 1955

INVENTORS:
ERWIN BÜHRER
MAX WERNLI
BY

Nov. 25, 1958 E. BÜHRER ET AL 2,861,672
INTER-CONVEYER TRANSFER MEANS FOR USE WITH
MULTIPLE CONVEYER SYSTEMS
Filed Dec. 28, 1955 6 Sheets-Sheet 6

INVENTORS
ERWIN BÜHRER
MAX WERNLI
BY

United States Patent Office 2,861,672
Patented Nov. 25, 1958

2,861,672

INTER-CONVEYER TRANSFER MEANS FOR USE WITH MULTIPLE CONVEYER SYSTEMS

Erwin Bührer and Max Wernli, Schaffhausen, Switzerland, assignors to Georg Fischer Aktiengesellschaft, Schaffhausen, Switzerland, a Swiss company Application December 28, 1955, Serial No. 555,986

Claims priority, application Switzerland August 2, 1955

8 Claims. (Cl. 198—85)

This invention relates generally to transporting means and more particularly to an arrangement for transferring individual conveying elements from one conveyer or transporting line to another, whereby said conveyor lines extend in superposed position to each other.

More particularly, the invention relates to a transport or transfer system and especially one for lifting individual objects or bodies from a lower conveying line to an upper conveying line arranged for position above the lower one and moving in directions opposite to one another.

The invention further contemplates a similar transfer system for taking off individual conveying elements from an upper conveying line for placement onto a lower conveying line, while the conveying means move in opposite directions.

Means are already known for transposing objects transported from a vertical conveyor to a horizontal conveyor in which to a rotatable lifting arrangement is imparted a peripheral velocity which is greater than the transporting velocity at which said objects are moved on the conveying means. By virtue of the differential between the peripheral velocity of the lifting arrangement and the transporting velocity of the conveying means the objects may be loaded from a vertical conveyor to a horizontal conveyor without interruption of the movements of said conveying means.

Such a construction taking into account the increase of the peripheral velocity of the lifting arrangement entails, however, certain considerable disadvantages. A most detrimental drawback to the conveying operation is due to the fact that the conveying means as well as the objects to be handled are subjected to impacts and like stresses at the instant when they are gripped or released by the lifting arrangement.

Further lifting and lowering arrangements are known which consist of two cranks which are spaced from each other and rotatable about parallel axes. During transfer of an object from one conveyor to another, the cranks directly engage said objects and effectuate by means of abutments which are actuated by the cranks and the objects being transferred, lifting or lowering of the latter.

In another known construction of this type there are provided on both sides of the conveying element being conveyed two uniformly rotating cranks of a lifting and lowering arrangement, interconnected by means of respective links in such a manner, that the latter underlie and serve as supports for said conveying element. In such known arrangement the interconnected cranks must be positively displaced away from each other along their axis of rotation in order to prevent upon further movement of the cranks a subsequent collision between the links and the conveying element located on the lower conveying line after said conveying element was deposited on the latter.

All known conveying arrangements, in which a rotatable lifting or lowering device either lifts or lowers an individual conveying element from one conveyer line to another located either above or below the first named conveyer line and moving in an opposite direction, have been found in practice to be unsuitable and commercially unacceptable. The impact-like accelerations engendered thereby either lead to damage of the transported object, for example, a sand mold as used in foundries, or to skidding of the transported object on the individual conveying elements and thus to considerable wear and tear. Moreover, impact-like accelerations and stresses cause generally frequent interruptions of operation and necessitate many repairs.

It is, therefore, an object of the present invention to provide means avoiding such impact-like accelerations and stresses and other undesirable influences and further means ensuring rotation of lifting and lowering devices at changing or varying velocities so that the devices are moved in synchronism with each other.

Another important object of the invention resides in the provision of means facilitating the selection of the peripheral speed of the rotating lifting and lowering arrangements or devices during receiving or discharging of the individual conveying elements relative to the transporting system in such a manner that the horizontal velocity components of said devices correspond to the horizontal velocity of the respective conveying means.

Still another object of the invention is the provision of means affording substantially smooth and highly efficacious operation between and transfer of conveying elements from one to another conveying line which are arranged in substantially superposed positions.

These and other objects of the invention will become further apparent from the following detailed description, reference being made to the accompanying drawings, showing preferred embodiments of the invention.

Figure 1:
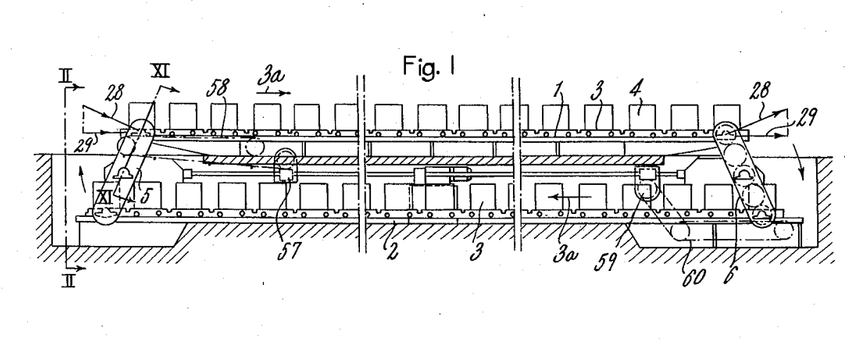
Fig. 1 is a side elevational view of one embodiment of the invention, schematically illustrating a conveyer system with the view taken substantially along line I—I of Fig. 2.
Figure 2:
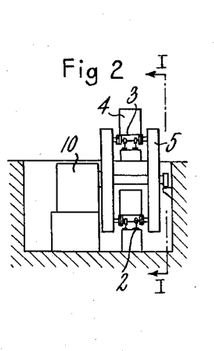
Fig. 2 is an end elevational view, as seen from line II—II of Fig. 1.
Figure 3:
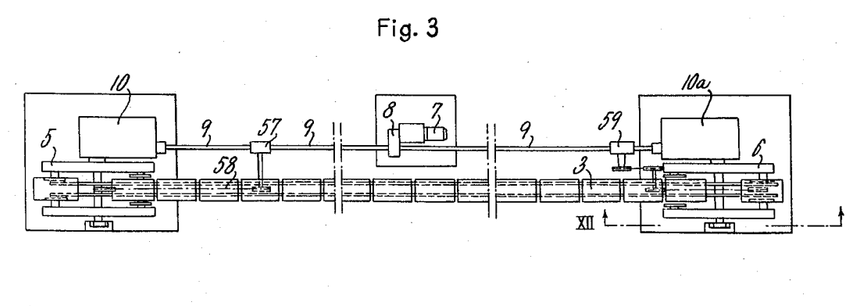
Fig. 3 is a top plan view of the system shown in Figs. 1 and 2.

Referring now more particularly to Figs. 1, 2 and 3, the conveyer system comprises an upper conveyer track or line 1 and a lower conveyer track or line 2 located directly below the conveyer track or line 1. On these conveyer tracks, conveying elements for example, in the form of carriages 3 are moved in the direction of arrows 3a. Conveying objects 4 transported on lines 1 and 2 are supported by said carriages 3 and may comprise, for example, mold flasks for use in a foundry.

Adjacent one end of the conveyer lines 1 and 2 is located a lifting device 5, while a lowering device 6 is located adjacent the other or opposite end of said conveyer lines, both said lowering and lifting devices constituting respective transfer means. An electric motor 7 is drivingly connected through gearing 8 and drive shaft 9 to suitable transmission means 10 and 10a associated with the lifting device 5 and lowering device 6, respectively.

Figure 10:
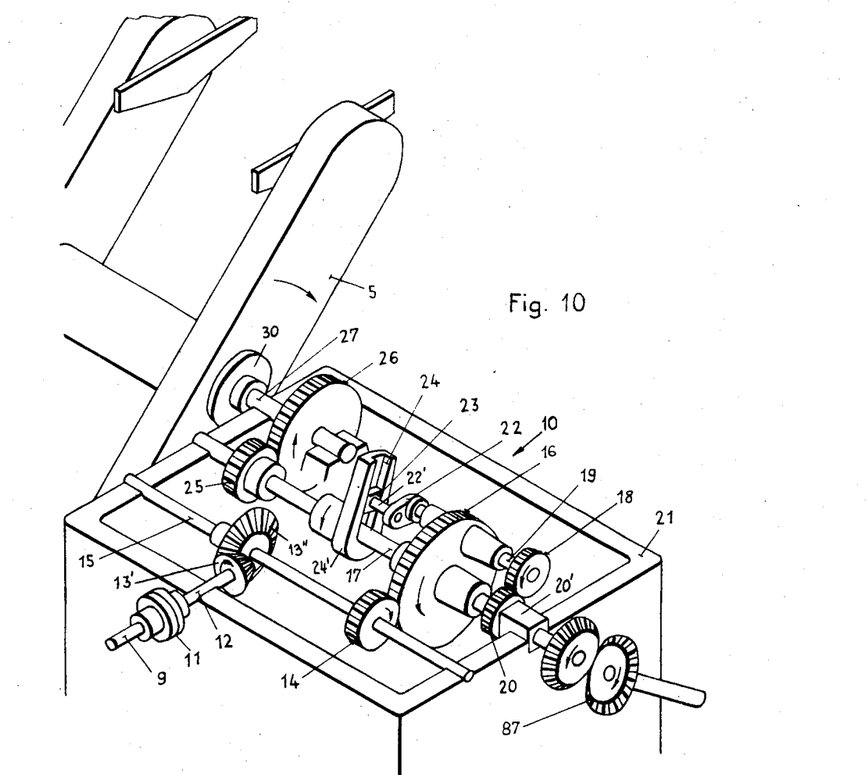
Fig. 10 is a perspective view of a housing with the drive mechanism for the lifting and lowering devices, employed in accordance with the present invention.

The transmission means 10 and 10a comprise planetary gear drives as shown in Fig. 10, arranged to effectuate movement of the transfer devices 5 and 6 with varying speeds. The electric motor 7, which is a reversible motor, serves as the central power source for the entire conveyer system and drives a multistage gearing arrangement 8, whereby the conveyer throughput may be varied from a maximum of 100% to a minimum of less than 50% in a series of fine steps.

Arranged intermediate the ends of the shaft 9 and between the motor 7 and transmission means 10 is a worm gearing 57 through which the conveyer chain 58 for the upper conveyer line 1 is driven. Also arranged on the shaft 9 but between the motor 7 and the transmission means 10a is a worm gearing 59 through which the actuating mechanism with driving chain 60 for the lower conveyer line 2 is driven.

As stated above, the shaft 9 is connected to the transmission means 10 and 10a for driving through the latter the lifting and lowering devices 5 and 6. Inasmuch as the two transmission means are substantially identical, only one of same will now be described, it being understood that the connections between the shaft and both said transmission means are also identical.

Referring now to Fig. 10, the shaft 9 is provided at one end with a friction or other suitable coupling 11 through which it may be connected to or disconnected from the transmission means 10 for the lifting device 5. Connected to said end of the shaft 9 by means of the coupling 11 is a shaft 12 rotatable in the same direction, a bevel gear 13' being mounted on the end of the shaft 12 remote from said coupling. The gear 13' meshes with a larger bevel gear 13" mounted on a shaft 15 extending perpendicular to shaft 12 and carrying a spur gear 14.

The gear 14 meshes with and drives a planetary gearing 16 which is rotatably supported on a shaft 17. Arranged on gearing 16 is a shaft 19 to the outer end of which is fixed, as by means of a key (not shown) a spur gear 18. This latter gear 18 meshes with a gear 20 which is connected to the housing 21 of the transmission means 10 by a rectangular extension 20', for example, so as to prevent rotation of the gear 20 relative to the housing.

In this manner, rotation of the planetary gear 16 causes the gear 18 to roll around the gear 20. The shaft 19 is rotated as the gear 18 performs its rolling movement to drive a crank 22 attached to the other end of the shaft 19. The crank is provided with a crank pin 22' at the free end of which is carried a slide or guide element 23 arranged to slide reciprocally in a guide channel 24 of a suitable guide member 24' which is affixed by a key (not shown) to the shaft 17.

A spur gear 25 is also affixed to the shaft 17 and meshes with a gear 26 mounted on a shaft 27 connected to the lifting device 5 by means of a flange 30, whereby the gears 25 and 26 constitute a reduction gearing for the lifting device 5 (or, of course, for the lowering device 6).

The transmission system shown in Fig. 10 transforms the uniform rotary motions of the shaft 9 into variable rotary motions of the shaft 27 through which the lifting and lowering devices are actuated. The use of a planetary gear drive as a means for varying the rotational speed of the lifting and lowering devices enables the principal concept of the invention to be put into effect, namely, that the rotational speed or peripheral velocity 28 (Fig. 1) of each of the rotatable transfer devices is so chosen that at the instant of taking up or depositing a conveying element to be conveyed, the horizontal velocity components 29 correspond to the velocity of the respective conveyer line, the rotational speed then being a minimum, while during transfer this speed increases to and decreases from a maximum, respectively. Thus the respective lifting and lowering movements may be carried out in a period of time which corresponds to or depends on the rate of delivery of conveying elements by the respective conveyers, or conveying lines to said lifting and lowering devices.

Referring again to Fig. 1, the lowering device 6 is shown in the position in which the upper arm of said device has just come into engagement with a carriage 3 and object 4 positioned thereon. This position corresponds to a predetermined point on a curve of an angular velocity diagram for the rotating shaft 27 (Fig. 10), and in particular to a minimum point on said curve.

After the conveying element or carriage is taken up by the lowering device 6 from the upper conveyer belt, the rotary motion of the latter is first accelerated and then decelerated up to the moment when the carriage arrives at or is deposited on the lower conveyer line. The lifting device 5 is operated in the same manner. Through experience the transmission system shown in Fig. 10 has been found to be especially well adapted for the purposes of the present invention.

According to Figs. 1 to 3 a two-armed lifting device 5 and lowering device 6 is provided with conveying element carrying or supporting elements 43 movable parallel to each other, and with means for displacing said elements toward or away from each other. This is shown in greater detail on an enlarged scale in Fig. 11, where the upper conveyer line 1 on which the carriage 3 and object 4 are normally disposed is represented by two rails. As indicated above, the gear 26 is mounted on the shaft 27 extending from the transmission housing 21, the shaft being provided with a terminal flange 30 fixed to a portion of the housing of the lifting device 5.

Figure 11:
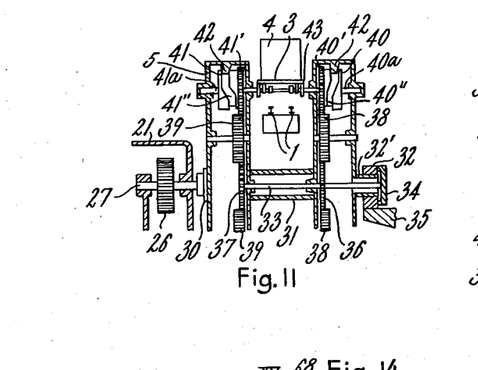
Fig. 11 is a partly sectional view of the rotatable lifting arrangement, taken along the line XI—XI of Fig. 1.

The left and right hand housings of the lifting device 5 are interconnected by means of a cylinder 31 and thus rotate together in synchronism. A bearing 32 rotatably supports a cylindrical extension 32' of the right hand housing of the device 5 and thus constitutes the outer support for said device, the transmission housing 21 being the inner support for said device. A shaft 33 extends through the cylinder 31 and the cylindrical extension 32' and is fixedly connected to a bearing cap 34 attached to the bearing 32. The bearing 32 is fixedly mounted on a bracket or base 35, whereby the shaft 33 is secured against rotation.

Two gears 36 and 37 are mounted on the shaft 33 in the housings of the device 5, respectively, and are thus also secured against rotation.

Rotatably mounted in the housings of the device 5 are gears 38 and 39 which mesh on one side with the gears 36 and 37 and on the other side with gears 40' and 41' also rotatably mounted in said housings on axially displaceable shafts 40a and 41a. Fixed to the gears 40' and 41' and rotatable therewith are cam members 40 and 41 in which are formed circumferential cam grooves or keyways 40" and 41". Keys 42 fixed to the interiors of the housings of the device 5 extend into said grooves or keyways.

From the above it will be seen that when the lifting device 5 rotates the gears 38 and 39 roll about the gears 36 and 37 and thus rotate the cam members 40 and 41. By virtue of the engagement between the keys 42 and the cam grooves 40" and 41", the shafts 40a and 41a to which the cam members are fixed are axially displaced either toward or away from each other. In this manner, the conveying element carrying elements 43 which are mounted on the shafts 40a and 41a are also reciprocated toward or away from each other so as to be positioned either directly under the carriage 3 or out of reach with said carriage.

It will also be realized that the carrying elements 43, which are fixedly connected to the cam members 40 and 41, revolve about the axis of rotation of the shaft 27 and thus are continuously maintained parallel to the longitudinal direction of the conveyer belts 1 and 2. The above described arrangement can be applied equally well to the lowering device 6 located at the other end of the conveyer lines, so that each rotatable lifting and lowering device is provided with a conveying element carrying arrangement which is always maintained parallel to the longitudinal direction of the lines while it revolves in a planetary manner about the axis of rotation of its respective device.

Figure 12:
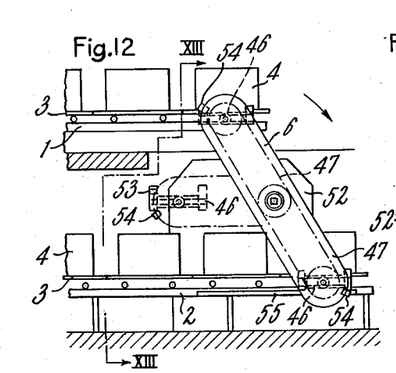
Fig. 12 is a side elevational view of a lowering device, taken along the line XII—XII of Fig. 3, and illustrating a modified form of displacing mechanism for object-supporting elements of said device.
Figure 13:
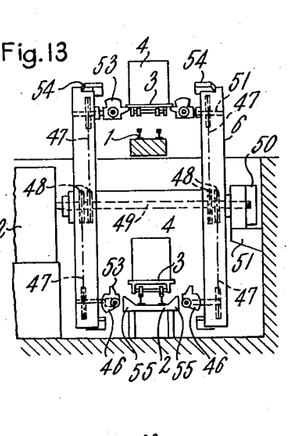
Fig. 13 is a sectional view taken along the line XIII—XIII of Fig. 12.

Referring now to Figs. 12 and 13, the lowering device 6 there shown is provided with modified conveying element carrying elements 46. The upper and lower conveyer lines are designated by respective pairs of rails on which the carriages 3 with objects 4 move in such a manner that those on the upper conveyer line 1 move toward the lowering device while those on the lower conveyer line move away from the lowering device.

As in the case of the carrying elements 43, the carrying elements 46 are always moved parallel to the longitudinal direction of the conveyer lines. To this end, sprocket chains 47 are provided which mesh with and are driven by sprocket wheels 48 rotatably mounted on a shaft 49 which is fixedly connected to a bearing cap 50 rigidly mounted on a bracket or base 51. Thus, the shaft 49 is fixed and secured against rotation.

A gear transmission mechanism 52, the arrangement and construction of which corresponds to the system illustrated in Fig. 10, is employed to drive the lowering device 6 at variable angular speeds. The carrying elements 46 comprise pivotally mounted grippers 53 which are arranged to be pivoted or swung downwardly by means of cams 54 (shown in dotted lines in Fig. 12) as the corresponding arms of the device 6 are rotated upwardly.

The rails 55 of the lower conveyer line 2 serve to pivot the grippers 53 upwardly as the corresponding arms of the device 6 are rotated downwardly. In this manner, the grippers 53 are moved laterally of and past the carriage 3 and object 4 which have just been deposited on the lower conveyer line 2 and are rolling therealong away from the device 6.

The operation of the conveyer system illustrated in Figs. 1 to 3 is as follows:

The motor 7, which is preferably a constant-speed motor, drives the conveyers 1 and 2 at constant speed through the drive shaft 9 and sprocket chains 58 and 60. Simultaneously, the motor drives the lifting device 5 and the lowering device 6 through shaft 9 and the variable-speed transmissions 10 and 10a, respectively. Thus, objects 4 on carriages 3 are conveyed toward and away from the lifting device and the lowering device at a constant speed.

The lifting device 5, when constructed in the manner shown in Fig. 11, transfers one carriage 3 after another with the object 4 supported thereon from the lower conveyer 2 to the upper conveyer 1. The cam grooves 40" and 41" are so shaped that when the corresponding arms of the housings of the device 5 have been rotated to their lower positions, the shafts 40a and 41a are moved axially toward each other to position the carrying elements 43 as close to each other as possible.

Upon further rotary movement of the lifting device, the carrying elements engage the lower surface of the carriage 3 and raise the latter with its object 4 from the conveyer 2. The speed of movement of the device 5 is now increased by the transmission system 10 and then decreased as the carrying elements on which the carriage is supported approach the upper conveyer 1.

The cam grooves or keyways in the cam members 40 and 41 are further shaped in such a manner that as soon as the carriage 3 has been deposited on the rails or other conveying elements of the conveyer 1, the continued rotation of said cam members causes the shafts 40a and 41a to be moved axially away from each other so as to withdraw the carrying elements 43 from beneath the carriage 3.

As the lifting device continues its rotary movement, the carrying elements are retained in their retracted positions, whereby they are enabled to pass laterally of another carriage 3 and object 4 on the lower conveyor belt 2. This sequence of operation is then repeated on another carriage, it being remembered that at the same time that one pair of arms of the lifting device was depositing a carriage on the upper conveyer line, the other pair of arms of said device was removing or taking up the next carriage and object from the lower conveyer line.

Concurrently with the lifting operation at one end of the conveyer lines, the lowering device 6 transfers individual carriages 3 with their respective objects 4 from the upper conveyer line 1 to the conveyer line 2. As may be seen from Figs. 12 and 13, when the device is approximately horizontal (as shown in broken lines in Fig. 12), the grippers 53 at that end of said device which is moving upwardly are engaged by the cams or abutments 54 and pivoted downwardly, i. e. toward each other (see Fig. 13).

As a result of further rotary movement of the device 6, the extended grippers 53 engage the lower surface of a carriage 3 and lift the latter from the conveyer line 1. The speed of rotation of the lowering device 6 is now increased by the transmission system 52 (corresponding to the system shown in Fig. 10) until the corresponding arms of the device approach the lower conveyer line 2.

After the carriage 3 has been deposited on the rails or other conveying elements of the conveyer line 2, further rotary movement of the device 6 brings the grippers 53 into engagement with the rails or abutments 55 which pivot the grippers upwardly, i. e. away from each other, so as to permit them to pass laterally of the conveyer line 2 and any carriage supported thereon during their return movement toward the cams 54. It will, of course, be realized that concurrently with the above described depositing of a carriage 3 on the conveyer line 2 the second pair of grippers 53 lifts another carriage 3 from the upper conveyer line for transfer to the lower conveyer line.

Figure 4:
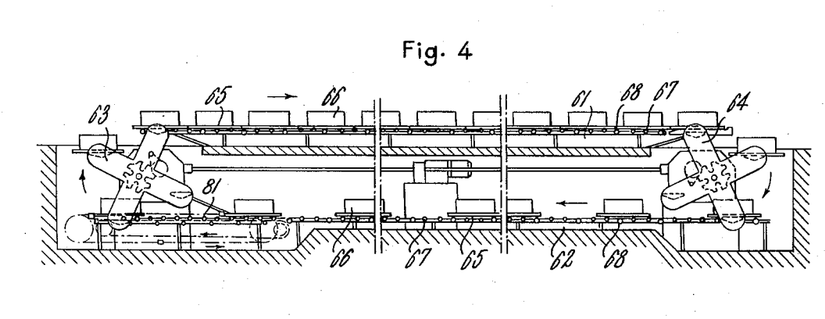
Fig. 4 is a schematic side elevational view of a second embodiment of a conveyer system according to the present invention, as seen from line IV—IV of Fig. 5.
Figure 5:
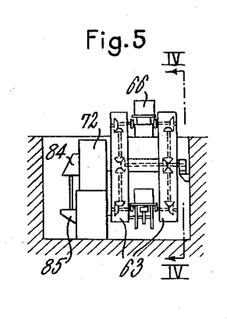
Fig. 5 is an end elevational view, as seen from line V—V of Fig. 6, of the conveyer system schematically illustrated in Fig. 4.
Figure 6:
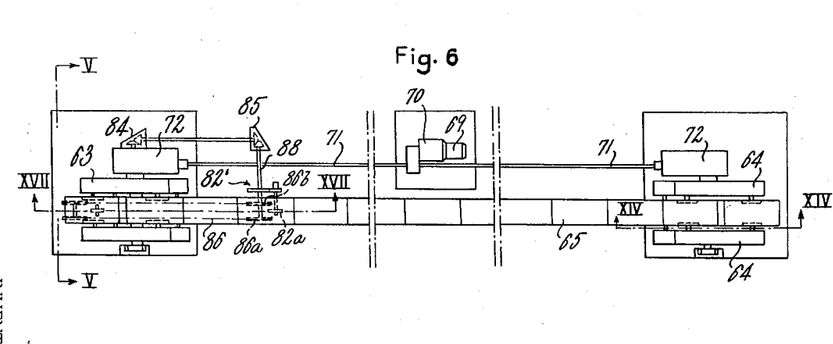
Fig. 6 is a top plan view of the system, shown in Figs. 4 and 5.

Turning now to Figs. 4, 5 and 6, it will be seen that between the upper conveyer line 61 and the lower conveyer line 62 there are provided a four-armed lifting device 63 and a like four-armed lowering device 64. Positioned on the conveyer line are plates 65 supporting objects 66 to be conveyed.

The conveying action is effected by means of a plurality of spaced, parallel drive rollers 68 actuated by motors or like drive means (not shown), a plurality of idler rollers 67 being located intermediate the rollers 68. A motor 69 is connected to a drive shaft 71 through gearing 70 and drives the entire conveyer system with the exception of the drive rollers 68.

Figure 14:
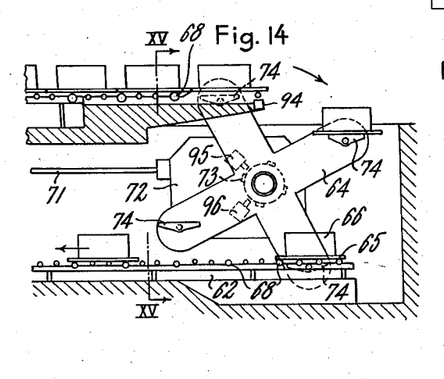
Fig. 14 is a view of a lowering device, with a section taken along the line XIV—XIV of Fig. 6.

The drive means for the rollers 68 of the upper conveyer line 61 are operated intermittently, being actuated when a cam or lug 73 operates a switch 96 and being deactuated by means of an end switch 94 (Fig. 14). Simultaneously, the uniform rotary motion of the drive shaft 71 is transformed by means of the transmission systems 72 into variable rotary motions of the lifting device 63 and the lowering device 64.

As may be seen from Fig. 4, a Maltese-cross transmission may be employed to impart the above-mentioned variable motions to the lifting and lowering devices. The drive rollers 68 located at the right hand or receiving end of the lower conveyer line 62 may be driven continuously.

Figure 15:
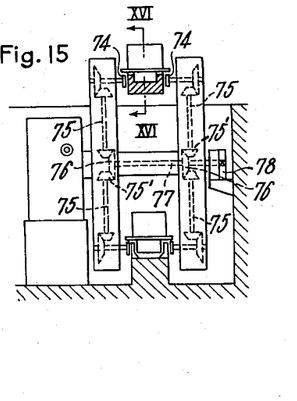
Fig. 15 is a sectional view taken along line XV—XV of Fig. 14.

The lowering device 64, which is shown on a somewhat enlarged scale in Figs. 14 and 15, is provided with four arms at the outermost ends of which are arranged carrying elements 74, respectively. The carrying elements 74 are always retained parallel to the longitudinal direction of the conveyer lines by means of bevel gear transmissions 75 carrying respective bevel gears 75' meshing with and rolling about fixed bevel gears 76.

Figure 16:
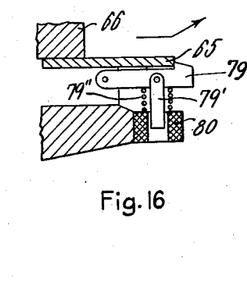
Fig. 16 is a fragmentary sectional view taken along line XVI—XVI of Fig. 15.
Figure 17:
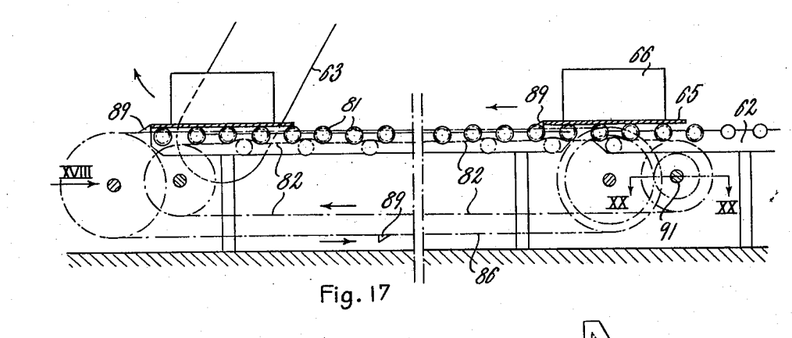
Fig. 17 is a partly sectional view, taken along the line XVII—XVII of Fig. 6, showing the discharge end portion of the lower conveyer line.
Figure 18:
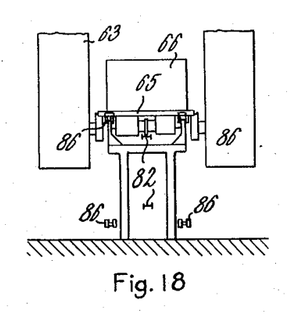
Fig. 18 is an end elevational view taken in the direction of the arrow XVIII of Fig. 17.

The fixed bevel gears 76 are keyed to a shaft 77 which is secured against rotation by means of a bearing cap 78 rigidly mounted on a bracket or base of the conveyer system. The carrying elements 74 are constructed to engage the lower surface of a plate 65 located on the upper conveyer line 61 with the leading edge of said plate in engagement with an abutment 79 (Fig. 16).

Shortly prior to the lifting of the plates 65 from the conveyer line 61, a control cam 73 actuates an electric switch 95 to cause a current impulse of predetermined period to flow in a magnet coil 80 to draw a core 79' pivotally connected to said abutment downwardly, whereby the abutment 79 is drawn downwardly against the force of a spring 79" so as to release the plate 65. The latter can thus be advanced by the last roller 68 into a position where the carrying elements 74 can engage it.

As will be readily realized, after the plate 65 is deposited on the receiving end of the lower conveyer line 62, further rotation of the lowering device separates the carrying element 74 from the lower surface of the plate 65. The latter and the object 66 supported thereon are immediately moved along the conveyer line 62 by the rollers 68 since the latter are continuously rotated.

In this manner, the plate 65 is moved completely past the circular path of movement of the lowering device 64 so that upon further rotation of the latter the carrying elements do not come into the range of the plate and the object thereon.

Figure 19:
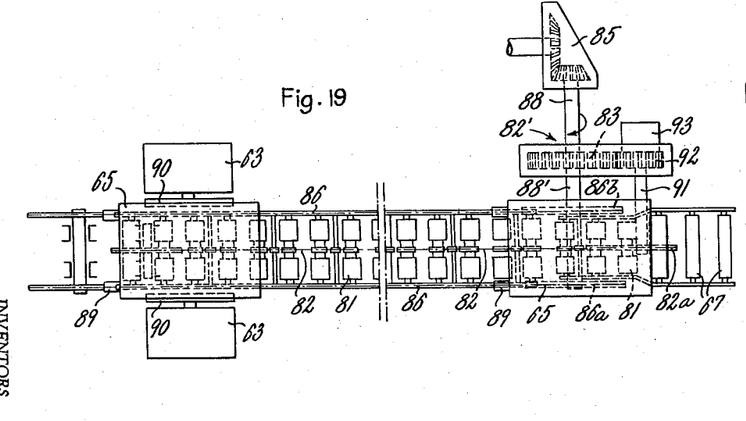
Fig. 19 is a top plan view of the conveyer system shown in Fig. 17.

The plates 65, after being deposited on the receiving end of the conveyer line 62, are moved toward the discharge end of said line which is shown in an enlarged scale in Figs. 17 to 20. The discharge end section of the conveyer line 62 comprises a plurality of dual section rollers 81 which are driven by a suitable endless sprocket chain 82 engaging them centrally and driven in turn at variable speed through a gear transmission 82' (Fig. 19).

As may be seen from Fig. 6, the chain 82 is effectively rotated and driven through bevel gears 84 and 85 which are driven in turn from the transmission system 72 of the lifting device 63. A shaft 88 driven by the bevel gears 85 is connected to a gear 83 of the gear transmission 82', the gear 83 meshing with a smaller gear 92.

A shaft 91 is connected to and driven by gear 92 of the transmission 82', the shaft 91 in turn driving a sprocket wheel 82a which is engaged by the chain 82. A shaft 88' is connected to and driven by the gear 83 and in turn drives a pair of axially aligned sprocket wheels 86a and 86b which mesh with a pair of braking chains 86. The braking chains 86 are provided with abutments 89 designed for engagement by the leading edge of a plate 65 being conveyed.

Since the driving chain 82 which imparts rotary motion to the rollers 81 moves at a greater velocity than the braking chains 86, each plate 65 is moved by the rollers 81 until its leading edge comes into engagement with a pair of the abutments 89, whereby the rate of movement of the plate necessarily becomes equal to the velocity of the braking chains 86.

As will be readily realized, the transmission system 63, the bevel gears 84 and 85 and the transmission system 82' may be so constructed that the movement of braking chains 86 is synchronized with the movement of the lifting device 63 so that the carrying elements 90 may engage the plates 65 at the right time and in the correct manner for lifting them off the conveyor line 62.

Figure 20:
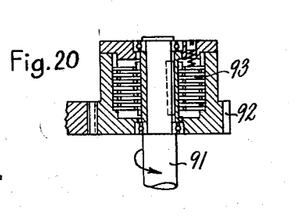
Fig. 20 is a sectional view of a slide or friction coupling employing in said conveyer system, the section being taken along the line XX—XX of Fig. 17.

In order to prevent frictional wear and tear or rubbing between the rollers 81 and the lower surface on each plate 65, a slide coupling 93 is interconnected between the gear 92 of the transmission 82' and the shaft 91.

Figure 7:
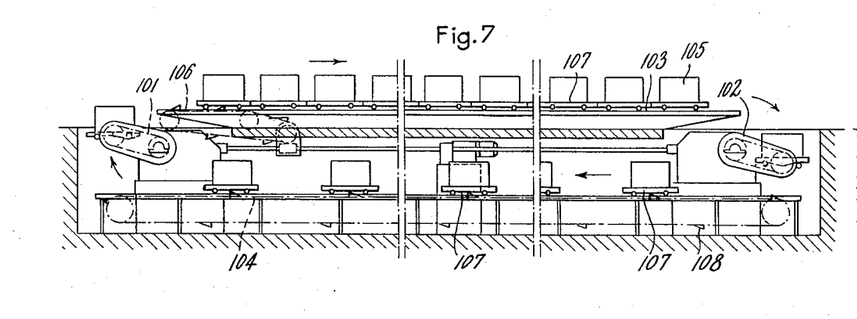
Fig. 7 is a schematic side elevational view of a third embodiment of the conveyer system according to the present invention, as seen from line VII—VII of Fig. 8.
Figure 8:
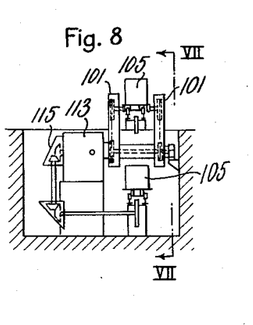
Fig. 8 is an end elevational view of the conveyer system of Fig. 7, as seen from line VIII—VIII of Fig. 9.
Figure 9:
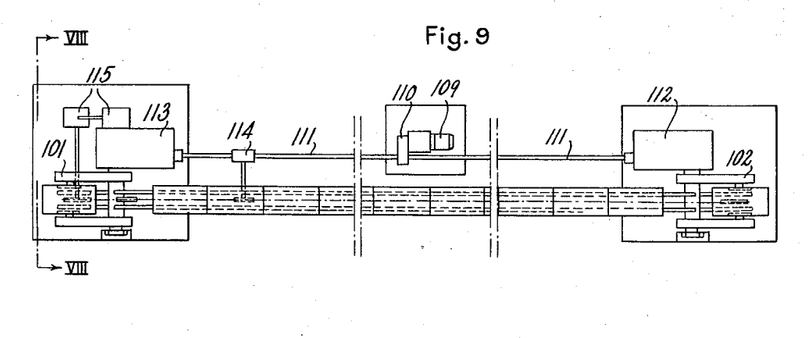
Fig. 9 is a top plan view of the conveyer system shown in Figs. 7 and 8.

Referring now to Figs. 7, 8 and 9, the modification of the conveyor system according to the present invention there shown comprises upper and lower conveyor lines 103 and 104, between which and adjacent opposite ends thereof are located a one-armed lifting device 101 and a one-armed lowering device 102. The conveyor lines transport carriages 107 on which are located objects 105, for example mold flasks to be used in a foundry.

The upper conveyor line 103 is driven by means of a sprocket chain 106 which imparts a uniform velocity to the carriages 107. The lower conveyor line 104 is driven by means of a sprocket chain 108 through which a variable velocity may be imparted to the carriages 107.

The entire conveyor system is driven by means of a motor 109 connected through gearing 110 to a drive shaft 111. The shaft 111 is connected at one end to a transmission system 113 for the lifting device 101 and at its other end to a transmission system 112 for the lowering device 102. Intermediate the ends of the shaft 111 is provided a worm gear transmission 114 through which the sprocket chain 106 is driven.

The transmission systems 112 and 113 are substantially like that shown in Fig. 10 and effect the variable-speed rotary motions of the lifting and lowering devices. The variable-speed motion of the sprocket chain 108 is likewise derived from the transmission system 113 through a bevel gear arrangement 115.

In this modification of the invention, the drive motor 109 is automatically shut off or deactuated after each complete rotation of the lifting and lowering devices. Suitable switching arrangements (not shown) may be employed for this purpose. The motor 109, once stopped, must be restarted either by hand or through other means, such as the above referred to switching arrangement, for example. Thus it will be seen that this conveyor system operates intermittently.

The conveyor systems constructed in accordance with the present invention afford a number of advantages. Transfer of objects from one conveyor to another is effected without impact-like accelerations, or deceleration, whereby said objects are not damaged during said transfer.

Frictional wear resulting from the sliding contact between the objects or their supporting means and the conveyers is substantially eliminated, and, consequently, undesired or inopportune interruptions of the operation of the system and the need for frequent repairs which generally result from such wear are also substantially obviated.

Furthermore, since the variable peripheral velocity of the transfer devices brings about greater spacing of the individual carriages or like means during transfer thereof from one conveyor to the other, each individual carriage may be loaded over its entire supporting surface and to the maximum possible height above said surface. The various carriages may be arranged on the horizontal conveyers in uninterrupted rows or they may be suitably spaced from each other.

The present invention thus makes possible a practical arrangement of two vertically aligned conveyors in a foundry or smelting plant, for example, of which the upper one is located above the foundry or smelting plant floor while the lower conveyor is located below said floor. Such an arrangement is especially advantageous due to the fact that the conveyor located above the floor is accessible from all sides while the space above said conveyer is completely unobstructed.

It is, of course, understood that a number of constructional variations of the conveyor system are possible. By way of example, the entire system may be driven only by electrical means while the synchronism between the lifting and lowering devices and the conveyor belts may be effected electrically, as through the use of a self-synchronous motor-generator system.

Moreover, it is not essential that a conveyor system employing parallel superposed horizontal conveyors be provided with both a lifting device and a lowering device. Thus, where objects, for example, are to be conveyed from a supply station to a receiving station, where the receiving station is located at an elevated position with respect to the supply station, only a lifting device would be necessary for raising the objects from the lower conveyor to the upper conveyor. Depending on the operating conditions involved, only a lowering device might be necessary for the operation of the conveyor system.

Accordingly, it will be seen that there has been provided, in accordance with the present invention, a conveyer system comprising a first driven horizontal conveyer for transporting objects in one direction, a second driven horizontal conveyer located above and in alignment with said first conveyor for transporting said objects in the opposite direction, rotatable transfer means arranged adjacent at least one end of said conveyers for removing said objects sequentially from one of said conveyers and depositing them on the other conveyer, and means operatively connected to said transfer means for imparting to the latter variable rotational speeds to effect transfer of said objects from one conveyer to the other in substantially shockfree manner.

Various other changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a conveying system having oppositely driven upper and lower conveyers positioned one above the other for transporting objects in opposite directions; lifting means disposed between and adjacent corresponding first ends of said conveyers and arranged for rotation about a first horizontal axis perpendicular to said directions, said lifting means including supporting elements engageable with an object carrying element being transferred from said lower conveyer to said upper conveyer, lowering means disposed between and adjacent corresponding second ends of said conveyers and arranged for rotation about a second horizontal axis parallel to said first axis, said lowering means including supporting elements engageable with an object carrying element being transferred from said upper conveyer to said lower conveyer, drive means for said lifting means and said lowering means, said drive means being operatively connected with said conveyers, variable speed transmission means operatively connected to said drive means and including means for varying the rotational speed of said lifting and lowering means, whereby said rotational speed is to assume a minimum corresponding at least to the speed of said conveyers, when engaging and disengaging, respectively, an object carrying element at said conveyers, to ensure substantially shock-free transfer of said object carrying element between said conveyers and said lifting and lowering means, respectively, and whereby said rotational speed increases to a maximum to carry out each lowering and lifting movement between said conveyers within a period of time depending on the rate of delivery of said object carrying elements by said conveyers to said lowering and lifting means, respectively.

2. A conveyer system comprising a first driven horizontal conveyer for transporting objects in one direction, a second driven horizontal conveyer located above and in alignment with said first conveyer for transporting said objects in the opposite direction, rotatable transfer means arranged adjacent at least one end of said conveyers for removing said objects sequentially from one of said conveyers and depositing them on the other conveyer, and operable means connected to said transfer means for imparting to the latter variable rotational speeds, said operable means including motor means, and transmission means driven by said motor means and interconnecting the latter and said transfer means, said transmission means including gearing means for varying the rotational speed of said transfer means in such a manner that both at the time of removal of an object from one of said conveyers and at the time of depositing of an object on the other conveyer, the horizontal component of the linear peripheral velocity of said transfer means corresponds at least to the transporting velocity of the respective conveyers, to thereby effect transfer of said objects from one conveyer to the other in substantially shock-free manner.

3. A system according to claim 2, said gearing means comprising a planetary gear arrangement operatively connected to said motor means and a crank arrangement operatively connected to said transfer means and driven by said planetary gear arrangement.

4. A system according to claim 2, wherein said motor means comprises constant-speed motor means, further comprising means operatively connecting said motor means with at least one of said conveyers, whereby the latter is driven by said motor means at a constant speed and in synchronism with said transfer means.

5. A system according to claim 2, further comprising means operatively connecting said transmission means with at least one of said conveyers, whereby the latter is driven by said motor means at variable speeds and in synchronism with said transfer means.

6. A system according to claim 2, said transfer means including members engageable with said objects for supporting the latter during transposing thereof from one of said conveyers to the other, said members being arranged in pairs on opposite sides of said conveyers for movement along substantially parallel planetary paths about the axis of rotation of said transfer means.

7. A system according to claim 6, said members being arranged for displacement transversely of said paths toward and away from one another, respectively, to thereby dispose said members in and out of the range of said objects, respectively, further comprising first means for substantially simultaneously displacing said members of each pair of members toward one another upon approach of the latter to said one conveyer from which an object is to be removed, to thereby enable said object to be carried by said members, and second means for substantially simultaneously displacing said members of each pair of members away from one another subsequent to depositing of said object removed from said one conveyer onto the other conveyer.

8. In a conveying system having oppositely driven upper and lower conveyers positioned one above the other for transporting objects in opposite directions; transfer means disposed between and adjacent corresponding ends of said conveyers and arranged for rotation about a horizontal axis perpendicular to said directions, said transfer means including supporting elements engageable with an object carrying element being transported from one of said conveyers to the other of said conveyers, drive means for said transfer means, said drive means being operatively connected with said conveyers, variable speed transmission means operatively connected to said drive means and including means for varying the rotational speed of said transfer means, whereby said rotational speed is to assume a minimum corresponding at least to the speed of said conveyers, when engaging and disengaging, respectively, an object carrying element at said conveyers, to ensure substantially shock-free engagement and disengagement of said object carrying element, respectively, and whereby said rotational speed increases to a maximum to carry out each transfer movement between said conveyers within a period of time depending on the rate of delivery of said object carrying elements by said one conveyer to said transfer means.

References Cited in the file of this patent

UNITED STATES PATENTS

| | | |
|---|---|---|
| 1,062,001 | Hall | May 20, 1913 |
| 1,837,605 | Baker | Dec. 22, 1931 |
| 2,623,626 | Ditolla | Dec. 30, 1952 |